United States Patent [19]
Tanizawa et al.

[11] Patent Number: 4,563,482
[45] Date of Patent: Jan. 7, 1986

[54] FORMABLE VINYL CHLORIDE-BASED RESIN COMPOSITION

[75] Inventors: Ryozo Tanizawa; Takeji Yanagisawa, both of Ibaraki, Japan

[73] Assignee: Shin-Etsu Chemical Co., Ltd., Tokyo, Japan

[21] Appl. No.: 672,299

[22] Filed: Nov. 16, 1984

[30] Foreign Application Priority Data

Nov. 21, 1983 [JP] Japan ................ 58-218948

[51] Int. Cl.$^4$ ............................. C08J 9/10; C08J 9/14
[52] U.S. Cl. ...................................... 521/92; 521/145
[58] Field of Search ................................. 521/92, 145

[56] References Cited

U.S. PATENT DOCUMENTS 3,876,622  4/1975  Motokawa et al. ................ 521/145
3,975,315  8/1976  Parks ................................. 521/145
4,039,488  8/1977  Vander Mark ..................... 521/145
4,430,460  2/1984  Martin ................................ 521/145
4,431,575  2/1984  Fujie et al. ........................ 521/145

Primary Examiner—Morton Foelak
Attorney, Agent, or Firm—Toren, McGeady, Stanger, Goldberg & Kiel

[57] ABSTRACT

The invention proposes a foamable vinyl chloride-based resin composition capable of giving a shaped article having a cellular foamed structure and a beautiful surface with metallic luster. The composition comprises (a) 100 parts by weight of a vinyl chloride-based resin compound of a transparency formulation having a specified transparency, (b) 0.1–5 parts by weight of a powder of a metal or alloy having a specified average particle diameter, (c) 0.01–2 parts by weight of an organic dye or pigment and (d) 0.1–5 parts by weight of a blowing agent.

3 Claims, No Drawings

FORMABLE VINYL CHLORIDE-BASED RESIN COMPOSITION

BACKGROUND OF THE INVENTION

The present invention relates to a foamable vinyl chloride-based resin composition or, more particularly, to a vinyl chloride-based resin composition capable of foaming into a cellular porous body of the resin having a beautiful appearance with metallic luster of the surface.

As is well known, vinyl chloride-based resins are outstandingly inexpensive in comparison with othr syntheric resins and capable of being molded easily into a variety of shaped articles along with the development of the technology of molding in recent years. Shaped articles of vinyl chloride-based resins have well-balanced mechanical properties and high flame retardancy so that they are widely used in various fields of applications as a building material, wrapping material and the like. Typical examples of the shaped articles of vinyl chloride-based resins include pipes, corrugated boards, decking boards, window frames, sheets and the like with the rigid-type formulations of the resin composition and films, insulation of electric wires, miscellaneous goods and others with the flexible-type formulations of the resin composition containing a plasticizer.

As a trend in recent years, a rapidly increasing proportion of the shaped articles of vinyl chloride-based resins is directed to those having cellular porous structure by foaming a foamable resin composition with an object of weight decrease and increase in the heat insulation as well as decrease of the cost for a unit volume of the shaped article. The demand for such foamed products is directed more and more to shaped articles having higher commercial values not only in the performance in use but also in the aesthetic appearance thereof. For example, shaped articles of a vinyl chloride-based resin having metallic surface finish are preferred in the market with their lustrous appearance and massiveness. Such a metallic-finished article is manufactured usually by plating of a pre-shaped article with a metal or by lamination of a metal-deposited film. The method of metal plating on a plastic-made article is naturally under limitations by the material of the substrate plastic and the process of plating on a plastic substrate is complicated with low productivity so that the method is not widely accepted for the purpose with the considerbly high cost of the products. The laminating method with a metal-deposited film is also not free from several problems that an expensive laminating machine is indispensable, the process involves an increased nuumber of steps, the yield of acceptable products is not always high enough due to the meandering of the film in the course of lamination and the laminated film is sometimes exfoliated to expose the substrate surface before or during use of the article resulting in a greatly decreased commercial value of the product.

SUMMARY OF THE INVENTION

It is therefore an object of the present invention to provide a novel and improved composition of vinyl chloride-based resin capable of foaming into a cellular porous body having a beautiful metallic surface with less expensiveness.

Thus, the vinyl chloride-based resin composition of the present invention capable of giving a foamed shaped body having a metallic surface comprises:

(a) 100 parts by weight of a vinyl chloride-based resin compound of a transparency formulation;

(b) from 0.1 to 5 parts by weight of a metal powder having an average particle diameter in the range from 10 to 40 $\mu$m;

(c) from 0.01 to 2 parts by weight of an organic dye or pigment; and (d) from 0.1 to 5 parts by weight of a blowing agent.

DETAILED DESCRIPTION OF THE PREFERRED EMBODIMENTS

As is described above, the base component in the inventive composition is a vinyl chloride-based resin compound of a transparency formulation, i.e. a resin compound capable of being shaped into a transparent resin article, and it is obtained by admixing a vinyl chloride-based resin with additives having no adverse influences on the transparency of the resin article shaped of the resin compound. As an example of such additives, suitable stabilizers include liquid stabilizers such as tin mercaptides, tin maleates and tin laurates as well as calcium/zinc type, barium/zinc type and cadmium/barium type stabilizers. The lubricant should have good miscibility with the vinyl chloride-based resin and are exemplified by ester-type waxes and higher alcohol-type waxes. Other classes of additives may also be added such as modifiers, foaming aids, plasticizers and the like.

The above mentioned foaming aids are used with an object to improve the uniformity of the foams and to increase the retentivity of the foams in the course of foaming of the resin composition. Suitable foaming aids are exemplified by acrylic resins and copolymeric resins of acrylate, butadiene and styrene. Inorganic fillers such as calcium carbonate should not ba added to the inventive composition since such a filler has an effect of decreasing the transparency of the resin compound.

The transparency formulation of the resin compound here implied is defined as follows. Namely, the light transmission through a sheet or plate of 1 mm thickness molded of the resin compound should be at least 70% as determined by use of a haze meter according to the testing method specified in JIS K 6717.

The vinyl chloride-based resin as the principal constituent of the resin compound, i.e. the component (a), is not limited to polymers of specific types but may be selected from a variety of resins mainly composed of vinyl chloride including homopolymeric polyvinyl chloride resins, copolymers of vinyl chloride, graft copolymers and polymer blends. The comonomers copolymerized with vinyl chloride are exemplified by vinyl acetate, vinylidene chloride, acrylic and methacrylic acids as well as esters thereof, acrylonitrile, olefins such as ethylene and propylene, maleic acid, maleic anhydride and others. These comonomers may be used either singly or as a combination of two kinds or more in the copolymerization with vinyl chloride. The resins to be blended with a vinyl chloride resin to form a polymer blend should have good compatibility with the vinyl chloride resin and are exemplified by copolymers of ethylene and vinyl acetate, copolymers of acrylonitrile, butadiene and styrene, chlorinated polyethylenes, copolymers of acrylonitrile and butadiene and the like.

The kind of the metal powder to be contained in the inventive resin composition is not particularly limited to a particular metal or alloy but should preferably be selected from the class consisting of aluminum, copper, brass and the like relatively inexpensive metals or alloys from the economical standpoint. It is essential in the inventive resin composition that the powder of metal or alloy should have an average particle diameter in the range from 10 to 40 $\mu$m. When the average particle diameter of the powder is smaller than 10 $\mu$m, the shaped articles molded of the resin composition would have a metallic luster with dullness so that the products are unsatisfactory in respect of the bright appearance. When the average particle diameter of the powder is larger than 40 $\mu$m, on the other hand, disadvantages are caused that the foamability of the resin composition is decreased resulting in a rough surface as well as decreased physical properties of the shaped articles thereof.

The amount of the metal or alloy powder as the component (b) in the inventive resin composition should be in the range from 0.1 to 5 parts by weight or, preferably, from 0.3 to 3 parts by weight per 100 parts by weight of the vinyl chloride-based resin compound as the component (a). When the amount of the metal or alloy powder is too small, the resultant shaped article of the resin composition cannot be imparted with satisfactory metallic luster as a matter of course while an excessively large amount of the powder may decrease the moldability of the resin composition to cause clogging of the breaker plate, screens and the like in the molding machine in addition to the increase in the cost and decrease in the physical properties of the shaped articles.

The dyes or pigments as the component (c) are limited to organic ones because inorganic pigments decrease the transparency of the resin compound and are detrimental to the beautiful appearance of the shaped articles along with the adverse influences on the foaming velocity of the resin composition. Suitable organic dyes and pigment are exemplified by azoic and polyazoic ones.

The amount of the organic dye or pigment in the inventive resin composition should be in the range from 0.01 to 2 parts by weight per 100 parts by weight of the vinyl chloride-based resin compound as the component (a). When the amount is too small, no vividly colored tone can be obtained in the metallic luster of the shaped articles while an excessively large amount of the dye or pigment is detrimental to the metallic luster of the shaped articles if not to mention the increase in the production cost due to the relative expensiveness of organic dyes and pigments.

The blowing agent as the component (d) may be either a decomposition-type one capable of producing a gas by thermal decomposition or a volatilization-type one capable of producing a gas by evaporation at an increased temperature. The blowing agent of the former type is exemplified by dinitrosopentamethylene tetramine, azodicarbonamide, azobisisobutyronitrile, 4,4'-hydroxy-bis(benzene sulfonyl) hydrazide, azo esters and the like and the blowing agent of the latter type is exemplified by aliphatic hydrocarbon compounds, halogenated hydrocarbon compounds and the like having a relatively low boiling point. The amount of the blowing agent in the inventive resin composition should preferably be in the range from 0.1 to 5 parts by weight per 100 parts by weight of the vinyl chloride-based resin compound as the component (a) though dependent on the desired bulk density of the foamed article shaped of the composition.

The foamable vinyl chloride-based resin composition of the invention can be prepared by uniformly blending the above described components and optional additives, if any, in a suitable blending machine such as a Henschel mixer, Bambury mixer and the like. The foamable vinyl chloride-based resin composition thus prepared can be fabricated into shaped articles by any conventional molding method according to the desired form of the shaped article by use of a suitable molding machine such as extrusion molding machine, injection molding machine, calendering machine, compression-molding press, powder coating machine and the like. The forms of the shaped articles prepared by using these machines include pipes, films, sheets and other articles having irregular configurations. The inventive resin composition is also applicable to the skin-forming molding method capable of forming a skin layer on the shaped article so that a shaped article provided with a skin layer having beautiful metallic luster can readily be obtained.

The inventive foamable vinyl chloride-based resin composition is suitable for the preparation of various kinds of shaped articles including parts of electric appliances and audio instruments, automobile parts, building materials, living necessaries and the like.

Following are the examples to illustrate the foamable vinyl chloride-based resin composition of the invention in more detail but not to limit the scope of the invention.

EXAMPLE 1

A vinyl chloride resin compound of a transparency formulation was prepared by uniformly blending, in a Henschel mixer with heating, 100 parts by weight of a homopolymeric vinyl chloride resin having an average degree of polymerization of about 700, 5 parts by weight of an acrylic resin, 1 part by weight of a tin mercaptide stabilizer, 1 part by weight of calcium stearate, 0.6 part by weight of an esteric wax, 0.2 part by weight of a paraffin wax and 0.3 part by weight of a polyethylene wax. The light transmission of a resin plate of 1 mm thickness prepared of this resin compound was 85% as determined according to the method specified in JIS K 6717.

The thus prepared resin compound was further admixed with various additives indicated in Table 1 below each in an amount indicated also in the same table by parts by weight using a Henschel mixer for 1 minute to give a foamable vinyl chloride-based resin composition. Meanwhile, the resin compound with further admixture of 20 parts by weight of the calcium carbonate filler had such a transparency that the light transmission of a 1 mm thick plate thereof was 55%.

Each of the thus obtained foamable resin compositions No. 1 to No. 7 was shaped by extrusion under the following conditions and the appearance of each of the shaped articles is shown in Table 1.

Extruder machine: 25-mm diameter single screw extruder

Screw: L/D=22 and CR=2.5

Extrusion die: a slit of 50 mm width and 1 mm thickness

Temperature conditions: $C_1=150°$ C.; $C_2=165°$ C.; $C_3=180°$ C. and $D=175°$ C.

Screw revolution: 25 rpm

Others: cooling roll and take-up roll used

EXAMPLE 2

A vinyl chloride-based resin compound of a transparency formulation was prepared by uniformly blending, in a Henschel mixer, 100 parts by weight of a homopolymeric vinyl chloride resin having an average degree of polymerization of about 700, 10 parts by weight of an acrylic resin, 1.5 parts by weight of a tin mercaptide stabilizer, 1.0 part by weight of calcium stearate, 0.6 part by weight of a rice wax, 0.3 part by weight of a paraffin wax and 0.3 part by weight of a polyethylene wax. This resin compound had such a transparency that the light transmission through a 1 mm thick plate molded thereof was 78%. The resin compound was further admixed with 1.0 part by weight of an aluminum powder having an average particle diameter of 15 μm, 0.02 part by weight of Irgazine Yellow and 0.8 part by weight of azodicarbonamide to give a foamable vinyl chloride-based resin composition.

TABLE 1

| | Resin composition No. | | | | | | |
|---|---|---|---|---|---|---|---|
| | 1 | 2 | 3 | 4 | 5 | 6 | 7 |
| Calcium carbonate | — | — | 20 | — | — | — | — |
| Aluminum powder, av. diameter 15 m | 0.5 | — | 0.5 | — | 0.05 | 1.5 | — |
| Aluminum powder, av. diameter 5 m | — | — | — | 0.5 | — | — | — |
| Brass powder, av. diameter 25 m | — | 1.0 | — | — | — | — | — |
| Pale Gold G, av.* diameter 50 m | — | — | — | — | — | — | 1.0 |
| Polyazo Orange | — | 0.02 | — | — | — | — | 0.2 |
| Chromophthal Brown | — | 0.02 | — | — | — | — | — |
| Irgazine Yellow | 0.02 | — | 0.03 | 0.02 | 0.01 | — | — |
| Azodicarbonamide | 0.3 | 0.3 | 0.3 | 0.3 | 0.3 | 0.3 | 0.3 |
| Foamed products | | | | | | | |
| Color tone | Silvery | Silvery | Silvery | Silvery | Silvery | Silvery | Golden |
| Metallic luster | Good | Good | No | No | No | Dark & dull | Rough surface |

*Tradename by Fukuda Kinzoku Hakufun Co.

This resin composition was shaped by skinned-foam molding under the following conditions to give a shaped foam article with skin which had a beautiful appearance with metallic luster.
Extruder machine: 25 cm diameter single screw extruder
Screw: L/D=22 and CR=2.5
Extrusion die: 3 cm×1 cm square rod cell die
Temperature conditions: $C_1=155°$ C.; $C_2=180°$ C.; $C_3=185°$ C. and $D=185°$ C.
Screw revolution: 30 rpm

EXAMPLE 3

A plasticized vinyl chloride-based resin compound of a transparency formulation was prepared by uniformly blending, in a Henschel mixer, 100 parts by weight of a homopolymeric vinyl chloride resin having an average degree of polymerization of about 1000, 80 parts by weight of dioctyl phthalate as a plasticizer, 5 parts by weight of an epoxy oil, 8 parts by weight of an acrylic resin, 5 parts by weight of a calcium/zinc liquid stabilizer and 0.5 part by weight of an esteric wax. This resin compound had such a transparency that the light transmission of a 1 mm thick plate molded thereof was 90%. The resin composition was further admixed with 0.5 part by weight of an aluminum powder having an average particle diameter of 15 μm, 0.02 part by weight of Irgazine Yellow and 0.6 part by weight of azodicarbonamide and pelletized to give a foamable vinyl chloride-based resin composition.

The thus obtained pellets of the foamable resin composition was shaped by injection molding under the following conditions to give a beautiful shaped article having metallic luster on the surface.
Injection molding machine: NIKKO ANCHOR 75 manufactured by Nippon Seikosho Co.
Metal mold: 15 mm×15 mm×120 mm square rod
Gate cross section: 3.14 mm²
Injection time: 10 seconds
Injection pressure, gauge: 75 kg/cm²
Temperature of metal mold: 7° C.
Temperature conditions: $C_1=110°$ C.; $C_2=150°$ C.; $C_3=145°$ C. and nozzle temperature=120° C.

What is claimed is:

1. A foamable vinyl chloride-based resin composition capable of giving a cellular foamed article having metallic luster on the surface which comprises:
   (a) 100 parts by weight of a vinyl chloride-based compound of a transparency formulation;
   (b) from 0.1 to 5 parts by weight of a powder of a metal or alloy having an average particle diameter in the range from 10 to 40 μm;
   (c) from 0.01 to 2 parts by weight of an organic dye or pigment; and
   (d) from 0.1 to 5 parts by weight of a blowing agent.

2. The foamable vinyl chloride-based resin composition as claimed in claim 1 wherein the vinyl chloride-based resin compound of a transparency formulation has such a transparency that the light transmission of a plate having a thickness of 1 mm molded therewith is at least 70% as determined according to the testing method specified in JIS (Japanese Industrial Standard) K 6717.

3. The foamable vinyl chloride-based resin composition as claimed in claim 1 wherein the amount of the powder of a metal or alloy is in the range from 0.3 to 3 parts by weight per 100 parts by weight of the vinyl chloride-based resin compound of a transparency formulation.

* * * * *